J. Q. CLARKE.
TIRE PROTECTING AUTOMOBILE BODY.
APPLICATION FILED JAN. 10, 1914.
1,191,401.
Patented July 18, 1916.
2 SHEETS—SHEET 1.
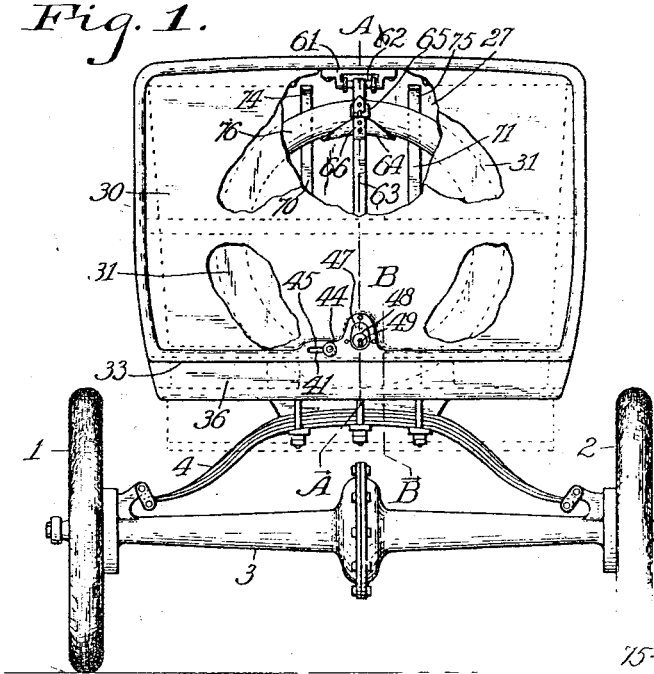
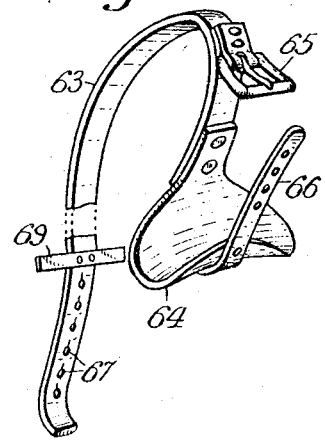
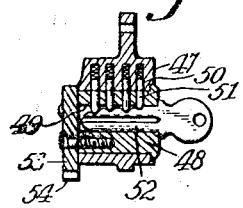
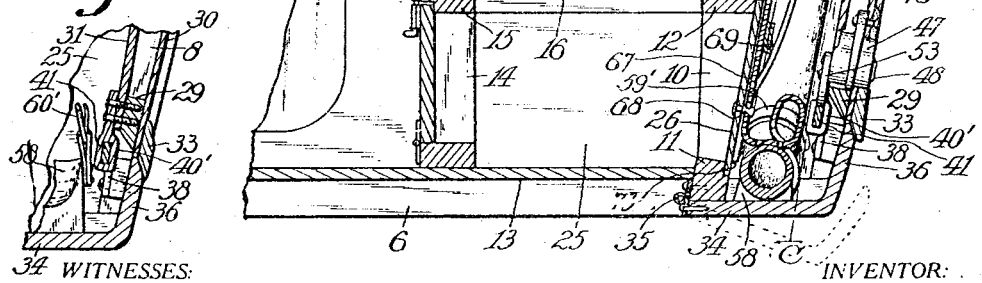
WITNESSES:
J. H. Gardner
M. E. Sparrow
INVENTOR:
John Q. Clarke,
BY
E. T. Silvius,
ATTORNEY.

J. Q. CLARKE.
TIRE PROTECTING AUTOMOBILE BODY.
APPLICATION FILED JAN. 10, 1914.
1,191,401.
Patented July 18, 1916.
2 SHEETS—SHEET 2.
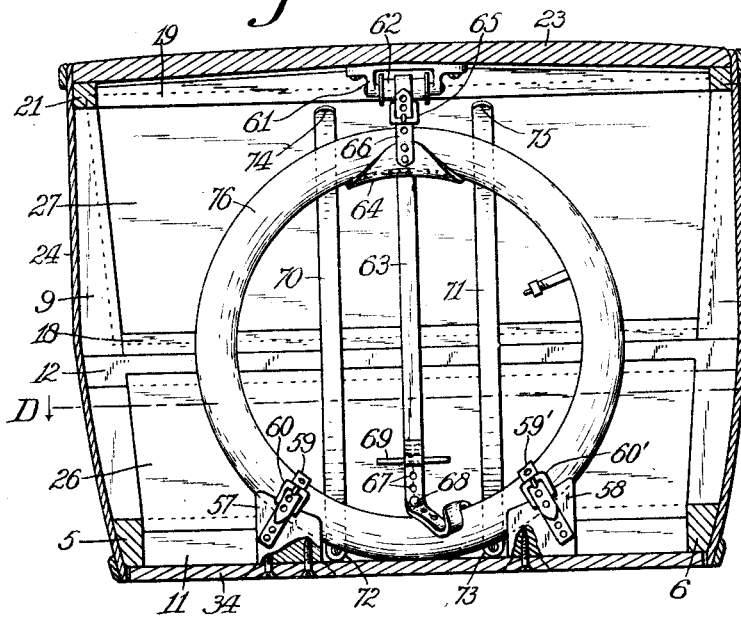
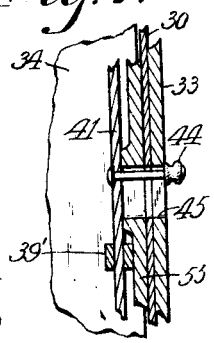
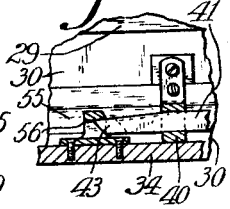
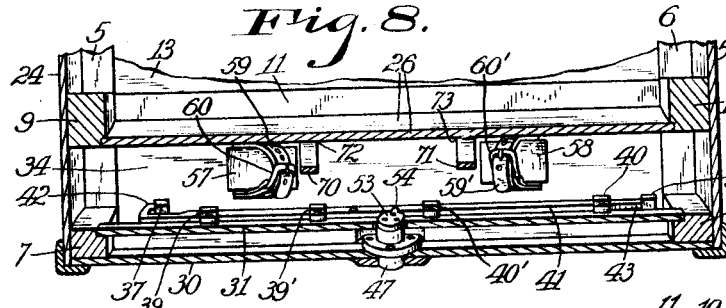
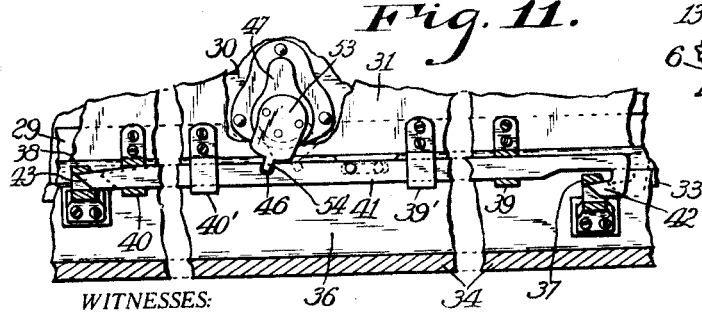
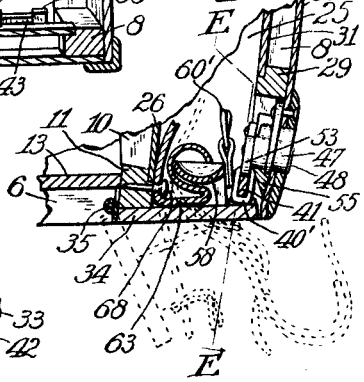
WITNESSES:
J. H. Gardner.
M. E. Sparrow.
INVENTOR:
John Q. Clarke,
BY
E. T. Silvius,
ATTORNEY.

UNITED STATES PATENT OFFICE.

JOHN Q. CLARKE, OF CRAWFORDSVILLE, INDIANA.

TIRE-PROTECTING AUTOMOBILE-BODY.

1,191,401.   Specification of Letters Patent.   Patented July 18, 1916.

Application filed January 10, 1914.   Serial No. 811,348.

*To all whom it may concern:*

Be it known that I, JOHN Q. CLARKE, a citizen of the United States, residing at Crawfordsville, in the county of Montgomery and State of Indiana, have invented a new and useful Tire-Protecting Automobile-Body, of which the following is a specification, reference being had to the accompanying drawings and to the letters and figures of reference marked thereon.

This invention relates to automobiles or similar vehicles that have pneumatic tires or other tires on their wheels, the invention having reference more particularly to an automobile body having a compartment in which a spare tire, or a rim and a tire thereon, or a complete spare wheel including its tire, may be conveniently carried to be used in emergency or when required to replace another.

An object of the invention is to provide improved means for enabling an automobile to carry spare wheel equipment in a secure and protected manner so as to be readily available when required for use.

Another object is to provide means for concealing and carrying a spare wheel equipment so that the same shall not be unsightly in appearance and shall not be exposed to dust, rain, or the sun's rays which exert a deteriorating influence thereon.

A further object is to provide improved means for securely carrying spare wheel equipment so as to guard against petty thefts thereof or injury thereto, which means shall be so constructed as to be relatively inexpensive, highly effective and also durable and economical in use.

With the above mentioned and other objects in view, the invention consists in an automobile or motor vehicle body provided with a protecting compartment adapted to securely carry a pneumatic tire or a wheel and a tire thereon so as to be substantially stationary in the compartment and not cause annoyance to the occupants of the vehicle, nor shift about in the compartment with consequent injury to the tire; the invention consisting further in novel means for securing the tire or wheel in the compartment, and comprising also a novel construction in automobile bodies whereby the tire-carrying compartment is produced, and novel means whereby the locking of the compartment so as to effect complete and secure inclosure is attained.

The invention also consists further in the novel parts and in the combinations and arrangements of parts as hereinafter particularly described and further defined in the accompanying claims.

Referring to the drawings, Figure 1 is a rear elevation of an automobile constructed substantially in accordance with the invention, in which portions are broken away and parts not relating to the invention omitted; Fig. 2, a perspective view of a hanger or hoisting appliance preferably employed in the tire-carrying compartment of the vehicle body; Fig. 3, a sectional view of a lock that is suitable for use in connection with the invention; Fig. 4, a fragmentary sectional view of the improved automobile body on the line A A in Fig. 1; Fig. 5, a fragmentary section approximately on the line B B in Fig. 1; Fig. 6, a section approximately on the line C C in Fig. 4 looking forward; Fig. 7, a fragmentary horizontal section of the rear portion of the body slightly modified; Fig. 8, a fragmentary section on the plane of line D D in Fig. 6; Fig. 9, a fragmentary side view showing the preferred form of latch bar for the door of the compartment; Fig. 10, a fragmentary section approximately on the line E E (in Fig. 12); Fig. 11, a fragmentary section approximately on the line C C in Fig. 4 looking rearward, and Fig. 12 is a fragmentary section approximately on the line A A in Fig. 1 but slightly modified.

Similar reference characters in the different figures of the drawings indicate corresponding elements or features of construction herein referred to.

In the drawings the numerals 1 and 2 indicate the rear wheels, 3 the rear axle, and 4 the springs whereby the axle supports the automobile body.

In practically carrying out the objects of the invention a suitable body frame is provided which, as illustrated, comprises two side sills or bars 5 and 6 on the rear ends of which two corner posts 7 and 8 are respectively secured, the posts preferably leaning slightly rearwardly, two other posts 9 and 10 being secured upon the sills at a suitable distance forward of the corner posts respectively, and preferably a transverse sill 11 is secured to the side sills at the bases of the posts 9 and 10 and support a seat frame member 12. A floor 13 is supported by the side sills 5 and 6 and extends forward from the sill 11, a seat frame support 14 being provided on which a seat frame member 15 is supported, and a suitable seat 16 is supported on the members 12 and 15 and provided with a cushion 17. Preferably a back rail 18 is arranged upon the member 12, another back rail 19 being connected to the posts 9 and 10 at a suitable height above the rail 18. A frame rail 20 is connected to the corner posts 7 and 8 opposite to the rail 19, and two relatively short rails 21 and 22 are connected to the rails 19 and 20, one being connected also to the posts 7 and 9 and the other to the posts 8 and 10, a roof or cover plate 23 being secured upon the rails 19 and 20, and 21 and 22, to complete the top portion of the tire-holding compartment. A body side plate or board 24 is secured to the posts 7 and 9 and also to the sill 5 and the rail 21, a similar side plate or board 25 being secured to the posts 8 and 10 and also to the sill 6 and the rail 22, the side plates or boards extending forward as may be required, the middle and forward portions of the automobile body being constructed as may be desired.

A panel plate or board 26 is secured to the sill 11 and the frame member 12 and also to the posts 9 and 10, another panel plate or board 27 being secured to the rails 18 and 19 and also to the posts 9 and 10 to constitute a seat back, the two plates or boards and the members to which they are connected comprising the forward wall of the tire-holding compartment, the forward side of which is provided with a suitable back cushion 28 that extends upward from the rail 18 to the rail 19 and preferably over the plate or board 23. A frame rail 29 is connected to the rear posts 7 and 8, preferably at a suitable height above the side sills 5 and 6, a rear plate or panel 30 being connected to the rails 29 and 20 and also to the corner posts on the rear or outer side thereof, a lining plate 31 preferably being connected to the forward or inner sides of the rails and posts so as to be opposite and slightly apart from the outer plate or panel 30, a stiffening rail 32 preferably being arranged between the two plates or panels, and the lower end of the plate or panel 30 preferably has a lip 33 thereon adapted to form a water shed. The structure, as will be seen, forms a compartment or chamber adapted to exclude dust or rain from the interior thereof, the chamber or compartment having an open lower end into which the wheel or tire may be inserted. The lower end of the compartment is normally closed by a suitable door 34 which is provided for the purpose and connected by means of hinges 35 to the rail 11, and in the preferred form the door has an oblique angled back portion 36 that extends upward to the rail 29 behind the water shed 33. The door is provided with suitable means for securing it in normal position, the back portion 36 preferably being provided with catch devices 37 and 38. Suitable guides 39, 39', and 40, 40', are secured on the inner side of the rail 29 or the lining panel 31 and guide a latch bar 41 so that the bar may move longitudinally in horizontal position, the opposite end portions of the bar having suitable latch bolt ends 42 and 43 adapted to engage the catch devices 37 and 38 respectively whereby the door is securely latched to the rear wall portion of the compartment. The latch bar preferably is provided with a knob 44, the shank of which extends through a slot 45 in the rear wall of the compartment so that the bar may be operated from the outer side of the compartment. The upper side of the bar 41 preferably has a recess 46 formed therein for controlling or locking the bar.

A suitable lock adapted to safeguard the contents of the compartment is a modification of the "Yale" type of lock comprising a lock case 47 secured to the panel plate 30 and having a cylinder 48 therein provided with a key hole 49, there being sections of bolts 50 mounted in the lock case and other bolt sections 51 mounted in the cylinder and controlled by a peculiar key 52 so that the cylinder cannot be turned excepting by means of a specially designed key difficult to imitate. A plate 53 is secured to the inner end of the cylinder and has a finger 54 thereon that extends into the notch or recess 46, so that the latch bar 41 may if desired be shifted by means of the key, and secures the bar in normal locked position when the cylinder is properly set and the key removed therefrom.

In some cases the rear wall of the compartment is extended down to the side sills 5 and 6 and includes a transverse rail 55, in which case the lip or back portion 36 of the door is omitted, the door extending to the rail 55 and is provided with catch devices 56 adapted to be engaged by the end portions of the latch bar 41. Various means may be provided within the compartment of the vehicle body for preventing the contents from being jolted about therein, two suitable tire seats 57 and 58 preferably being secured upon the inner side of the compartment door 34, one seat being provided with a strap 59 and a buckle 60, the other being provided with a similar strap 59' and a buckle 60' whereby to secure a tire or a demountable rim and a tire on the seats, the upper portion of the tire ordinarily leaning against the lining plate 31 for lateral support.

In order to steady the tire and also to afford means for easily lifting the tire or a demountable rim and a tire into the compartment a suitable pulley block or frame 61 is supported by the under side of the roof plate or board 23 and has a suitable pulley 62 mounted therein, a suitable strap 63 being placed on the pulley and provided with a hanger pad or saddle 64 adapted to support the upper portion of the tire or rim thereon, the strap 63 being provided with a buckle 65 to which is connected a strap or tongue 63 that is connected to the pad or saddle. The strap 63 is provided with suitable holes 67 to receive a knob or stud 68 which is secured to the panel 26 for holding the pad or saddle in proper position and preventing the tire from sagging down and from moving toward the sides 24 or 25 of the compartment, this appliance in some cases being sufficient without requiring the tire to be secured to the door or bottom of the compartment. The strap 63 preferably is provided with a suitable stop bar 69 to prevent the strap from being drawn through the pulley block or frame 61 when the tire is lowered from the compartment.

In same cases two elastic guides or spring fingers 70 and 71 are provided and have their base end portions 72 and 73 respectively secured to the panel 26, or obviously to the sill 11, and they extend upward in parallel arrangement opposite to the panel 27 and tend to press the tire to the lining plate 31 so that the upper portion of the tire cannot be jolted against the seat back 27 to the annoyance of the riders when the vehicle is in motion and to the detriment of the tire, the tire hanger being in some cases omitted, the upper portions of the guides or fingers having curved portions 74 and 75 respectively that are adapted to extend partially over the tire toward the rear wall of the compartment, a pneumatic tire 76 being illustrated as secured by all the appliances hereinbefore described, and obviously the appliances are equally well adapted for securing the tire when connected to a demountable rim. The securing devices, however, may be variously modified as may be found desirable in particular cases.

In practical use, in order to insert a tire into the compartment, the door 34 is opened to permit the insertion of the tire which is lifted upward into the compartment, after which the door is swung upward so as to support the tire, the strap 63 if provided being used to assist in elevating the tire and supporting it. Before the door is closed the straps 59 and 59', if provided, are connected to their buckles, after which the door is entirely closed and securely locked so as to prevent access to the contents of the compartment excepting by destructive force, the contents being effectually concealed and retained in proper position for the preservation thereof and protected from the weather.

In emergency, it is obvious that the door of the compartment may be readily unlocked by the proprietor and the tire quickly removed in a clean condition and good order so as to be ready for immediate use.

Having thus described the invention, what is claimed as new is—

1. An automobile body provided with a tire-receiving compartment, and an elastic guide bar secured at one end to the forward wall and extending upward and also toward the opposite rearward wall of the compartment.

2. An automobile body provided with a tire-receiving compartment, the rear wall of the compartment being plane-faced to form a supporting guide, and a plurality of elastic guide bars secured at one end to the lower portion of the forward wall and extending upward and also toward the rear wall of the compartment.

3. An automobile body provided with a tire-receiving compartment, the lower portion of the compartment being open and provided with a movable closure, the closure being constructed for bodily supporting a tire in the compartment, the rear wall of the compartment being plane-faced for guiding and laterally supporting the tire, and an elastic guide bar supported in the compartment and constructed for holding the tire in contact with the rear wall.

4. An automobile body provided with a tire-receiving compartment having tire-hoisting means supported in the upper portion thereof, the opposite forward and rearward walls of the compartment leaning rearwardly, the lower portion of the compartment being open, a door hinged to the body for closing the opening, and two elastic guide bars secured at one end to the lower portion of the front wall and extending upward and also rearward toward the upper portion of the rear wall of the compartment on opposite sides respectively of the tire-hoisting means.

5. An automobile body provided with a tire-receiving compartment having a pulley in the upper portion thereof, the lower portion of the compartment being open, a door hinged to the body for closing the opening, and a strap extending over the pulley and provided with a tire-supporter.

6. An automobile body provided with a tire-receiving compartment comprising two tire-receiving compartment, a front wall with a cushion on the front sides, a front wall with a cushion on the front side thereof to form a seat back, a rear wall, and a roof, all connected together, means for bodily supporting a tire in the compartment, and a device supported in the compartment and having a guide portion that extends from a point adjacent to the rear side of the front wall and upwardly toward the rear wall to guide and hold the tire away from the seat back.

7. An automobile body provided with a tire-receiving compartment comprising a front wall, a rear wall opposite the front wall, two side walls, a roof on the walls, a door hinged to the lower portion of the front wall and normally extending to the lower portion of the rear wall, a catch connected to the inner side of the door adjacent to the lower portion of the rear wall, a latch bar slidingly supported horizontally on the inner side of the lower portion of the rear wall to coöperate with the catch and secure the door to the rear wall, the bar having an operating device thereon that extends through the wall, and a lock mounted in the lower portion of the rear wall above the latch bar and having a device that is in engagement with the latch bar.

8. An automobile body provided with a tire-receiving compartment comprising a front wall, a rear wall opposite the front wall, two side walls, a roof on the walls, a door hinged to the lower portion of the front wall and normally extending to the lower portion of the rear wall, two tire-seats spaced apart and secured upon the inner side of the door, two buckles mounted on the tire-seats respectively, and two straps mounted also on the tire-seats to coöperate with the buckles respectively.

9. In a tire protecting carrier, the combination of a front wall, a rear wall, two side walls connected with the front and rear walls, a roof connected with all the walls and provided on the under side thereof with a pulley, and a strap extending over the pulley and provided with a saddle and means for securing a tire to the saddle.

10. In a tire-protecting automobile body, the combination of a front wall, a rear wall, two side walls connected with the front and rear walls, a roof connected with all the walls, and two guiding fingers connected at one end to the lower portion of the front wall and extending upward toward the roof and also rearward toward the rear wall between the side walls.

In testimony whereof, I affix my signature in presence of two witnesses.

JOHN Q. CLARKE.

Witnesses:
 ROBERT W. MARTIN,
 JAMES C. ODLE.